US010040959B2

(12) United States Patent
Deardurff et al.

(10) Patent No.: US 10,040,959 B2
(45) Date of Patent: *Aug. 7, 2018

(54) PIGMENT-BASED INKJET INKS

(71) Applicant: Hewlett-Packard Development Company, L.P., Fort Collins, CO (US)

(72) Inventors: Larrie Deardurff, Corvallis, OR (US); Jayprakash C. Bhatt, Corvallis, OR (US); Sterling Chaffins, Corvallis, OR (US); Cory J. Ruud, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/308,964

(22) PCT Filed: Jun. 4, 2014

(86) PCT No.: PCT/US2014/040834
§ 371 (c)(1),
(2) Date: Nov. 4, 2016

(87) PCT Pub. No.: WO2015/187144
PCT Pub. Date: Dec. 10, 2015

(65) Prior Publication Data
US 2017/0066940 A1    Mar. 9, 2017

(51) Int. Cl.
| | | |
|---|---|---|
| *C09D 11/38* | (2014.01) | |
| *C09D 11/033* | (2014.01) | |
| *C09D 11/102* | (2014.01) | |
| *C09D 11/322* | (2014.01) | |
| *C09D 11/40* | (2014.01) | |
| *B41J 2/01* | (2006.01) | |
| *C09D 11/36* | (2014.01) | |

(52) U.S. Cl.
CPC ............... *C09D 11/38* (2013.01); *B41J 2/01* (2013.01); *C09D 11/033* (2013.01); *C09D 11/102* (2013.01); *C09D 11/322* (2013.01); *C09D 11/36* (2013.01); *C09D 11/40* (2013.01)

(58) Field of Classification Search
CPC ..... C09D 11/38; C09D 11/033; C09D 11/102; C09D 11/322; C09D 11/40; B41J 2/01
USPC ..................................................... 106/31.89
See application file for complete search history.

(56) References Cited

U.S. PATENT DOCUMENTS

| | | | |
|---|---|---|---|
| 5,580,372 A | 12/1996 | Gino et al. | |
| 5,643,357 A | 7/1997 | Breton et al. | |
| 5,688,626 A | 11/1997 | Patel et al. | |
| 5,811,213 A | 9/1998 | Chiba | |
| 5,837,044 A | 11/1998 | Santilli et al. | |
| 6,667,140 B2 | 12/2003 | Tosaka et al. | |
| 6,730,155 B2 | 5/2004 | Gotoh et al. | |
| 7,250,078 B2 | 7/2007 | Iijima et al. | |
| 7,288,351 B2 | 10/2007 | Yaguchi et al. | |
| 7,429,293 B2 | 9/2008 | Cai | |
| 7,806,971 B2 | 10/2010 | Saito et al. | |
| 7,922,316 B2 | 4/2011 | Bannai et al. | |
| 7,922,800 B2 | 4/2011 | Bauer et al. | |
| 8,137,721 B2 | 3/2012 | Wen et al. | |
| 8,465,894 B2 | 6/2013 | Yamanaka et al. | |
| 8,500,897 B2 | 8/2013 | Tateishi | |
| 8,710,116 B2 | 4/2014 | Valentini et al. | |
| 9,187,661 B2 | 11/2015 | Prasad | |
| 9,340,694 B2 | 5/2016 | Oura et al. | |
| 2002/0009547 A1 | 1/2002 | Ito et al. | |
| 2004/0252169 A1 | 12/2004 | Chen et al. | |
| 2005/0008960 A1 | 1/2005 | Yaguchi | |
| 2005/0039634 A1 | 2/2005 | Hermansky | |
| 2005/0182154 A1 | 8/2005 | Berge et al. | |
| 2006/0046178 A1 | 3/2006 | Akiyama et al. | |
| 2006/0258775 A1 | 11/2006 | Lee | |
| 2009/0169761 A1 | 7/2009 | Szajewski et al. | |
| 2010/0285287 A1 | 11/2010 | Matsuyama et al. | |
| 2010/0302326 A1 | 12/2010 | Morohoshi et al. | |
| 2011/0030580 A1 | 2/2011 | Jackson et al. | |
| 2012/0050383 A1 | 3/2012 | Takayama et al. | |
| 2012/0183894 A1 | 7/2012 | Matsumoto et al. | |
| 2013/0063518 A1 | 3/2013 | Takebayashi et al. | |
| 2013/0065998 A1 | 3/2013 | Lai et al. | |
| 2013/0079442 A1 | 3/2013 | Ma et al. | |
| 2013/0307914 A1 | 11/2013 | Chen et al. | |
| 2013/0327247 A1 | 12/2013 | Khavari | |
| 2014/0247312 A1 | 9/2014 | Prasad | |
| 2017/0022383 A1 | 1/2017 | Prasad et al. | |

(Continued)

FOREIGN PATENT DOCUMENTS

| | | |
|---|---|---|
| EP | 1321495 | 6/2003 |
| EP | 1333070 | 8/2003 |
| EP | 2025726 | 2/2009 |
| EP | 2568017 | 3/2013 |
| EP | 2671928 | 12/2013 |
| JP | S56103262 | 8/1981 |
| JP | 2003140396 | 5/2003 |
| JP | 2006057044 | 3/2006 |
| JP | 2007140076 | 6/2007 |
| JP | 2013088482 | 5/2013 |
| WO | 2008048869 | 4/2008 |
| WO | 2013015813 | 1/2013 |
| WO | 2013052036 | 4/2013 |
| WO | 2015105503 | 7/2015 |

OTHER PUBLICATIONS

International Search Report dated Feb. 26, 2015 for PCT/US2014/040834, Applicant Hewlett-Packard Development Company, L.P.

*Primary Examiner* — Helene Klemanski
(74) *Attorney, Agent, or Firm* — Thorpe North & Western LLP

(57) ABSTRACT

The present disclosure is drawn to inkjet inks and related methods. The inkjet ink includes water, from 5 wt % to 50 wt % of an organic solvent system, from 2 wt % to 9 wt % pigment solids, from 0.1 wt % to 3 wt % polyurethane binder, and from 0.4 wt % to 1.5 wt % of an oleyl or stearyl type polyoxyethylene glycol ether surfactant.

13 Claims, 2 Drawing Sheets

(56) References Cited

U.S. PATENT DOCUMENTS

2017/0066940 A1    3/2017  Deardurff et al.
2017/0183522 A1*  6/2017  Chaffins, Jr. ......... C09D 11/322
2017/0183523 A1*  6/2017  Deardurff ............ C09D 11/322

* cited by examiner

PIGMENT-BASED INKJET INKS

BACKGROUND

There are several reasons that inkjet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in inkjet printing, accompanying this improvement are increased demands by consumers, e.g., higher speeds, higher resolution, full color image formation, increased stability, large format printing, etc.

A few characteristics of inkjet printing systems that are desirable to achieve relate to nozzle health, short term and sustained decap performance, kogation, color gamut, durability, ink efficiency, to name a few. Accordingly, investigations continue into developing ink formulations that can be printed accurately and with acceptable durability without excessive clogging.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
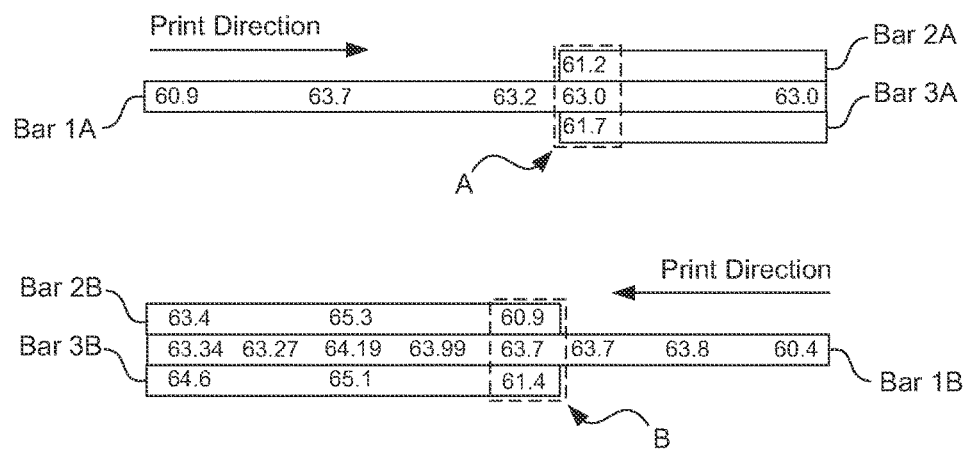
FIG. 1 provides a schematic representation of a top view of a print pattern of magenta ink images as they would be inkjetted in bar patterns to evaluate relative CIE L* values in accordance with examples of the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

The present disclosure is drawn to pigment-based inks that also include a polyurethane binder. In these inks, the polyurethane binder may be added to assist with several ink performance issues, such as sustained decap performance, short term decap performance, and/or scratch durability. However, when using polyurethane binders that assist with these and/or other properties, the presence of the polyurethane binder in the inkjet ink can introduce a printing artifact that may be undesirable. Specifically, certain pigment-based, polyurethane-containing inks can exhibit an initial negative CIE L* (or −ΔV) color shift upon printing that mostly resolves itself after about 2 inches of printing. Thus, for the first 2 inches of a print, the color may appear to be darker until the printhead and ink begin providing the expected color. Though L* is always a positive number, a negative difference relative to the L* value that begins to be more consistent or constant after printing 2 inches is visible to an ordinary observer, and thus, can be undesirable. In other words, this negative L* initial color shift can be very noticeable to a human observer and correction of this L* difference into a less noticeable range would be desirable. Thus, in accordance with examples of the present technology, a specific class of surfactant within a specific concentration range can be included in the inks of the present disclosure to ameliorate this initial negative color shift.

In accordance with this, in one example, a pigment-based ink can include water, from 5 wt % to 50 wt % organic solvent system, from 2 wt % to 9 wt % pigment, from 0.1 wt % to 3 wt % polyurethane binder; and from 0.4 wt % to 1.5 wt % oleyl or stearyl type polyoxyethylene glycol ether surfactant. In one example, from 0.05 wt % to 2 wt % non-ionic surfactant can also be included.

In another example, a method of inkjet printing can include jetting an inkjet ink from a nozzle onto a media substrate. The inkjet ink can include water, 5 wt % to 50 wt % organic solvent system, from 2 wt % to 9 wt % pigment, from 0.1 wt % to 3 wt % polyurethane binder, and from 0.4 wt % to 1.5 wt % oleyl or stearyl type polyoxyethylene glycol ether surfactant. In one example, from 0.05 wt % to 2 wt % non-ionic surfactant can also be included. After jetting, the method includes halting jetting from the nozzle for a period of at least 0.5 seconds, and restarting jetting from the nozzle, wherein an L* value for the inkjet ink initially printed after restarting ranges from an L* difference of −0.2 to 1.5 compared to an L* value of the ink after jetting two inches of inkjet ink on the media substrate.

As mentioned, polyurethane binder can be added to inks to assist with several ink performance issues, such as sustained decap performance, short term decap performance, and/or scratch durability, to name a few. However, when using polyurethane binders that assist with these and/or other properties, such as Hydran™ RW-7500 polyurethanes from DIC Corporation, Hydran™ RW-7581 also from DIC Corporation, Witcobonds® from Witco, or the like, for example, the inkjet ink can exhibit a printing artifact that is undesirable. This color shift can be corrected in accordance with examples of the present disclosure. In further detail regarding the polyurethane, in one example, the polyurethane binder can be a polyurethane with a side chains that is derived from a vinyl polymer having two hydroxyl groups on one end. In further detail, the polyurethane can be obtained by reacting a polyisocyanate with a polyol which includes a vinyl polymer and one or more other type of polyol, e.g., polyether polyol, polyester polyol, polyester ether polyol, polycarbonate polyol, etc.

As indicated, the surfactant choice at a specific concentration range is what largely solves the color shift that is introduced by the pigment and the polyurethane binder. More specifically, as mentioned, an oleyl or stearyl type polyoxyethylene glycol ether surfactant can be included at from 0.4 wt % to 1.5 wt %, and can be defined by the following formulations:

Oleyl type polyoxyethylene glycol ether

    Formula I

Stearyl type polyoxyethylene glycol ether

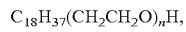    Formula II where n ranges from 2 to 20. The main difference between the oleyl type and the stearyl type polyoxyethylene glycol ether is the presence of a single "cis" unsaturated (oleyl) group along the hydrocarbon chain in Formula I, whereas the hydrocarbon chain in Formula II is fully saturated.

The oleyl type polyoxyethylene glycol ether may obtained commercially under the trade name Brij® OX, where O represent oleyl and X is from 2-20 (i.e. n of Formula I is from 2 to 20). In one specific example, Brij® O10 (where n=10 in Formula I) works well in accordance with examples of the present disclosure. Other examples surfactants that may be used include Brij® O20 (n=20 in Formula I), Brij® O2 (n=2 in Formula I), Brij® O3 (n=3 in Formula I), Brij® O5 (n=5 in Formula I), etc. The stearyl type polyoxyethylene glycol ether may obtained as a formulation sold under the trade name Brij® SX, where S represent stearyl and X is from 2-20 (i.e. n of the Formula II above is from 2 to 20). Examples include Brij® S10 (n=10 in Formula II), Brij® S5 (n=5 in Formula II), Brij® S15 (n=15 in Formula II), Brij® S20 (n=20 in Formula II), Brij® S2 (n=2 in Formula II), Brij® S7 (n=7 in Formula II), etc.

In the pigment-based inkjet inks and methods describe herein, the inks may have a negative $\Delta L^*$ (introduced primarily by the presence of the polyurethane binder) when the oleyl type polyoxyethylene glycol ether is not added, and/or removed and replaced with an equivalent weight concentration of water or other surfactant. Thus, by adding the concentration of 0.4 wt % to 1.5 wt % of the oleyl or stearyl type polyoxyethylene glycol ether, this noticeable negative $\Delta L^*$ print artifact can be ameliorated. The print artifact, as mentioned, occurs when an inkjet printhead stops firing, rests for a short period of time, e.g., at least 0.5 second, and begins firing again. The print artifact can also occur when the printhead stops for a longer period of time as well, e.g., seconds, minutes, hours, etc., with the upper limit being a length of time where the inkjet nozzles are no longer recoverable without undergoing cleaning or servicing. Thus, it is noted that even the very short period of time corresponding to the time some inkjet printhead carriages take to laterally travel the distance of a print media sheet during normal printer operation can lead to the darker initial printing color.

As an example of a practical printing situation where this may be highly noticeable, consider an inkjet print job where a set of nozzles begin firing to generate a first row, and a short time later, e.g., a few seconds, a second set of nozzles begin firing along an adjacent second row such that an initial darker portion of the second row is printed right next to the first row that has already normalized its L* color. An example of this is shown by representation in FIG. 1 (note that the print bars in an actual print test would be magenta print bars, but are shown in FIG. as line outlines to illustrate the printing pattern generally). In this FIG., multiple magenta ink rows are printed and L* measurements are taken along the respective rows. Essentially, a continuous stripe or bar of ink printed using the middle third of the nozzles (Bar 1) across the page. At about the halfway mark, the upper and lower thirds (Bar 2 and Bar 3, respectively) begin to print across the rest of the page. Example L* values are shown in the print bars representing actual example values and locations where L* measurements may be taken along each row. Since the printhead can print either in the left to right direction or in the right to left direction, a second test pattern may also be printed in the opposite direction (as shown below the first test pattern), resulting in two additional locations where the L* difference would be noticeable. The L* values of this FIG. indicate that this particular inkjet ink has not been corrected by the addition of an appropriate amount of oleyl or stearyl polyoxyethylene glycol ether surfactant. By adding from 0.4 to 1.5 wt % of this type of surfactant, the L* values at locations A and B for Bars 2A, 2B, 3A, and 3B will be closer in value to the L* value at locations A and B for Bar 1A and 1B, respectively, such that the difference in L* ($\Delta L^*$) may be in a more acceptable range from −0.2 to 1.5, rather than having the more significant negative differences shown in FIG. 1. It is notable that more negative $\Delta L^*$ values upon initial printing are more noticeable to a human eye than when the initial $\Delta L^*$ value is more positive. In further detail, Bars 1A and 1B start darker (lower L* value) and then lighten up (higher L* value). Then, when Bars 2A and 2B, as well as Bars 3A and 3B, are printed adjacent to Bars 1A and 1B, respectively at locations A and B, a noticeable difference color is present, particularly since these colors are printed immediately adjacent to one another.

Returning now to the inkjet ink formulations, in one example, a second surfactant can likewise be present, but it is not expected that the second surfactant plays a large role in reducing the relative initial negative $\Delta L^*$ values. The second surfactant may be included for other purposes, such as for decap performance or other properties. One particular class of surfactant that can be used with the oleyl type polyoxyethylene glycol ether surfactant is an acetylenic diol non-ionic surfactant. One such surfactant is sold under the trade name Surfynol® 104 (2,4,7,9-tetramethyl-5-decyne-4, 7-diol). In further detail regarding the surfactants, in one example, the oleyl type polyoxyethylene glycol ether may be present at a concentration greater than the non-ionic surfactant, and in another example, the concentration of the oleyl or stearyl type polyoxyethylene glycol ether can be from 0.5 wt % to 1 wt %, irrespective of the concentration of the non-ionic surfactant. Other surfactants can also be chosen for use, provided they do not interfere with the oleyl or stearyl type polyoxyethylene glycol ether's ability to fix the color shifting issues introduced by the polyurethane and pigment.

In the inks described herein, suitable co-solvents for use include water and water soluble organic co-solvents. Any of a number of solvents can be used, but in accordance with examples of the present disclosure, certain organic co-solvents are used to provide some of the benefits described herein. Triethylene glycol is one such solvent. Triethylene glycol provides the benefit of acting as a humectants providing improved short term decap performance. Additionally, the presence of a cyclic amide can provide certain benefits, including short term and sustained decap, and these solvents can work well with the surfactants described herein. Examples of cyclic amides that can be used include 2-pyrrolidinone and/or Dantocol [di(2-hydroxyethyl)-5,5-dimethylhydantoin]. In one example, there can be two cyclic amides present, e.g., a combination of 2-pyrrolidinone and Dantocol [or di(2-hydroxyethyl)-5,5-dimethylhydantoin], which may be particularly effective together, particularly when combined with the triethylene glycol. Benefits provided by this combination of cyclic amides and/or the triethylene glycol include assistance with nozzle health and trajectory at certain concentrations and ratios. It is noted that in one example, the presence of triethylene glycol, Dantocol, and 2-pyrrolidinone strongly interact with one another, so formulations that utilize all three tend to perform better with respect to short term decap, sustained decap, and trajectory than systems without all three solvents.

Examples of water soluble organic co-solvents that may be used additionally or alternatively to the co-solvents listed above include, but are not limited to, aliphatic alcohols, aromatic alcohols, diols, triols, glycol ethers, poly(glycol)

ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly (ethylene glycol) alkyl ethers, higher homologs of poly (ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that can be used include, but are not limited to, 1,5-pentanediol, 2-pyrrolidone, Liponic ethoxylated glycerol 1 (EG-1), Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, and derivatives thereof. Co-solvents can be added to reduce the rate of evaporation of water in the ink to minimize clogging or provide other improved properties related to viscosity, pH, surface tension, optical density, gamut, durability, decap, and print quality. The organic co-solvent system total concentration can range from about 5 wt % to about 50 wt %, or from 10 wt % to 40 wt %. Each organic co-solvent alone can be typically present at from about 0.1 wt % to about 20 wt % of the inkjet ink composition. That being stated, the solvents may be present in the inkjet ink composition at any concentration that is effective for use.

In another aspect of the present technology, various biocides can be used to inhibit growth of undesirable microorganisms. Several non-limiting examples of suitable biocides include benzoate salts, sorbate salts, and commercial products such as Nuosept®, Ucarcide®, Vancide®, Proxel® GXL, Anticide® B20 or M20, Kordex® MLX for example. Typically, such biocides include less than about 5 wt % of the inkjet ink composition and often from about 0.05 wt % to about 2 wt %.

The pigments that can be used in accordance with embodiments of the present disclosure include both self-dispersed pigments as well as conventionally dispersed pigments, e.g., pigments dispersed by a separate dispersing agent that is not covalently attached to the surface. If self-dispersed, a dispersant is typically prepared in a precursor form, and then the precursor is attached to the pigment to chemically modify the surface of the pigment. In one embodiment, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Other precursors can also be used to attach to the pigment, as would be known by those skilled in the art.

The formulations of the present disclosure can be effective for use with both black and colored pigments. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex® including 95, 85, 75, 55, 45, 300, 35, 25, 200, 12, and Special Blacks including, 4A, 4, 5, 6, 550, 350, 250; BP1100, BP900, BP800, M1100, M900, M800, Monarch® 1400, Monarch® 1300, Monarch® 1100, Monarch® 1000, Monarch® 900, Monarch® 880, and Monarch® 700; Cab-O-Jet® 200 and Cab-O-Jet® 300; Raven® 2500 Ultra, Raven® 2000, Raven® 7000, Raven® 5750, Raven® 5250, Raven® 5000, and Raven® 3500; 45 B, and combinations thereof.

If colored pigments are used, any of a number of pigments can be selected for inclusion in the inks of the present disclosure, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15, Pigment Blue 15:3 and Pigment Green 36). Representative examples of quinacridones include Pigment Orange 48, Pigment Orange 49, Pigment Red 282, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. One example of another azo pigment is Pigment Red 150. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources. It is noted that these pigments are often referred to using a related acronym, such as PY14 for Pigment Yellow 14, or PR282 for Pigment Red 282, for example, regardless of color.

Typically, the pigments of the present disclosure can be from about 5 nm to about 10 μm in size, and in one aspect, the pigments can be from 10 nm to about 500 nm in size, although sizes outside this range can be used if the pigment can remain dispersed and provide adequate printing properties.

In further detail regarding the pigments, with inks generally, colorants used to improve color gamut on the hue-saturation plane are often dyes rather than pigments. However, dye based inks can have poor durability (e.g. water fastness, light fastness, and air/ozone fastness). Ink formulations prepared in accordance with the present disclosure, even without the presence of dyes, can have acceptable color gamut, while at the same time providing acceptable decap performance and improved durability compared to dye-based inks.

It is noted that, as used in this disclosure, the singular forms "a," "an," and "the" include plural referents unless the context clearly dictates otherwise. Thus, for example, reference to "an ink" includes one or more of such inks, and reference to "the pigment" includes reference to one or more amounts of pigments.

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present disclosure. Such liquid vehicles may include a mixture of a variety of different agents, including without limitation, surfactants, organic co-solvents, buffers, biocides, viscosity modifiers, sequestering agents, stabilizing agents, and/or water. The liquid vehicle can also carry other additives such as latex particulates, binders, or other polymers, in some embodiments. It is noted that though the liquid vehicles of the present disclosure can include many of these ingredients, the present technology relates more specifically to the use of certain specific organic co-solvents and/or surfactants as set forth herein.

As used herein, "ink" refers to a single liquid vehicle that contains at least one pigment, and in accordance with embodiments of the present disclosure, the inks can also include polyurethane binder, as well as certain more specific classes of solvents and/or surfactants. In one example, the ink is an inkjet ink, and in further detail, a thermal inkjet ink.

As used herein, "pigment" refers to a colorant particle which is typically substantially insoluble in the liquid vehicle in which it is used. Pigments can be conventionally dispersed using a separate dispersing agent, or can be self-dispersed, having a dispersing agent attached to the surface of the pigment.

As used herein, "self-dispersed" generally refers to pigments that have been functionalized with a dispersing agent, such as by chemical attachment of the dispersing agent to the surface of the pigment. The dispersing agent can be a small molecule or a polymer or an oligomer. The dispersing agent can be attached to such pigments to terminate an outer surface of the pigment with a charge, thereby creating a repulsive nature that reduces agglomeration of pigment particles within the liquid vehicle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following examples illustrate the embodiments of the disclosure that are presently best known. However, it is to be understood that the following are only exemplary or illustrative of the application of the principles of the present technology. Numerous modifications and alternative compositions, methods, and systems may be devised by those skilled in the art without departing from the spirit and scope of the present disclosure. The appended claims are intended to cover such modifications and arrangements.

Example 1—Sample Formulations

Multiple inkjet ink formulations were prepared as set forth in Table 1, as follows:

TABLE 1

| Ingredient | Class | C1 | C2 | C3 | M1 |
|---|---|---|---|---|---|
| 2-Pyrrolidinone | Organic Co-solvent | 7.5 wt % | 7.5 wt % | 7.5 wt % | 7.5 wt % |
| Triethylene Glycol | Organic Co-solvent | 10 wt % | 10 wt % | 10 wt % | 10 wt % |
| Dantocol | Organic Co-solvent | 4 wt % | 4 wt % | 4 wt % | 4 wt % |
| Surfynol ® 104 | Surfactant | 0.3 wt % | 0.3 wt % | 0.3 wt % | 0.3 wt % |
| Brij ® O10 | Surfactant | 0.3 wt % | 0.3 wt % | 0.5 wt % | 0.3 wt % |
| Acticide ® B20 | Biocide | 0.16 wt % | 0.16 wt % | 0.16 wt % | 0.16 wt % |
| Acticide ® M20 | Biocide | 0.07 wt % | 0.07 wt % | 0.07 wt % | 0.07 wt % |
| Hydran ™ RW-7581 | Polyurethane Binder | 1 wt % | 1.15 wt % | 1 wt % | 1 wt % |

TABLE 1-continued

| Ingredient | Class | C1 | C2 | C3 | M1 |
|---|---|---|---|---|---|
| PB15:3 | Cyan Pigment | 2.96 wt % | 2.84 wt % | 2.96 wt % | — |
| PR122:PV19 (80:20 by weight) Solid Solution | Magenta Pigment | — | — | — | 3.03 wt % |
| PR150 | Magenta Pigment | — | — | — | 1.33 wt % |
| Water | Solvent | Balance | Balance | Balance | Balance |

Example 2—Color Shift and Correction

Figure 2:
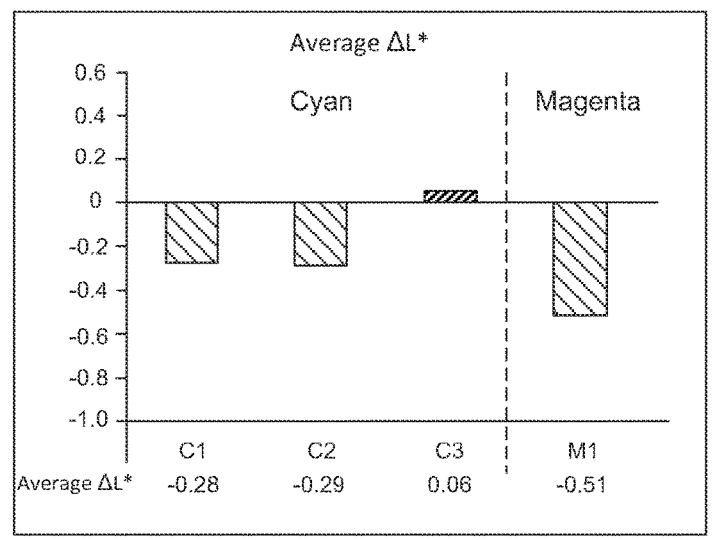
FIG. 2 is a bar graph depicting average ΔL* values of cyan and magenta inks comparing ink color as initially printed compared to ink color after a few inches of printing in accordance with examples of the present disclosure.

The three cyan inks (C1-C3) and the one magenta ink (M1) of Example 1 were printed in stripe or bar patterns and the L* value was measured along the various patterns to determined how much color shift existed upon initial printing, e.g., within about 1 to 2 inches, compared to along the balance of the stripe or bar. Essentially, the difference between the L* value between areas that had been printed by with nozzles with different firing histories were evaluated. To conduct the study, a continuous stripe or bar was printed using the middle third of the nozzles from either the cyan or magenta chambers across the page. At around the halfway mark, the upper and lower thirds began to print across the rest of the page. This concept was illustrated previously in FIG. 1. The CIE Lab color coordinates were then measured for the upper, middle, and lower thirds of the color swath at various points along the bars, but particularly where all the nozzles were initially firing together (at about halfway). The color shift can be readily seen where the difference in the L* values between the middle bar and the upper and lower bars where all are being printed at the same time (see location A in FIG. 1 for reference). Thus, two measures of the color shift can be obtained ($L^*_{upper}-L^*_{middle}$; and $L^*_{lower}-L^*_{middle}$). Since the printhead can print either in the left to right direction or in the right to left direction, a second test pattern was also printed in the opposite direction (also shown by example in FIG. 1), resulting in two additional determinations of the L* difference. Generally, 2-3 replicates are printed to ensure the data is accurate and reproducible. All printing is done on the same paper, which in this case was a Hewlett-Packard Multi-purpose ColorLok® paper. The printer used was a Office Jet Pro 8000. Eight to twelve measures of the L* difference were averaged together to produce an estimate of the color shift. Since darker colors have a lower L* values, a negative difference indicates a more undesirable color shift. Values of greater than or very near to zero or greater than zero indicate no discernible color shift. Data collected in this manner for the four inks tested from Example 1 (C1-C3 and M1) is provided in FIG. 2. Only C3, which had a concentration of 0.5 wt %, exhibited a positive ΔL* value as described herein.

Example 3—Color Shift and Correction

Figure 3:
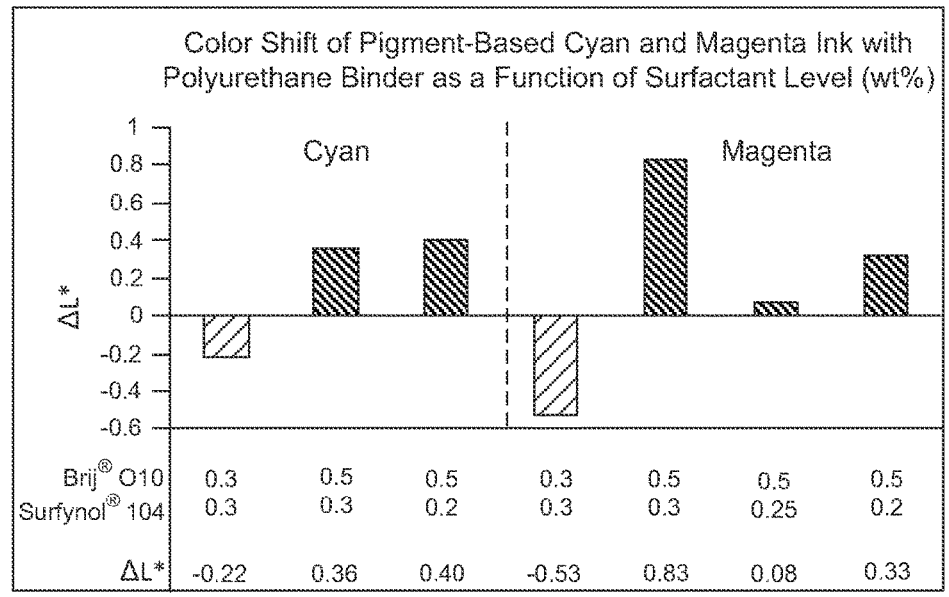
FIG. 3 is another bar graph depicting average ΔL* values of cyan and magenta inks comparing ink color as initially printed compared to ink color after a few inches of printing in accordance with examples of the present disclosure.

Another study was conducted that evaluated the impact of amounts or ratios between Brij® O10 and Surfynol® 104. Specifically, multiple cyan formulations and multiple magenta formulations were prepared which were similar to those described above as C1 and M1. The only difference was that the weight percentages were adjusted for the respective surfactants. The Surfynol® 104 was adjusted within the range of 0.2 wt % and 0.3 wt %, and the Brij® O10 was adjusted within the range of 0.3 wt % and 0.5 wt %. The results of the study are shown in FIG. 3. As can be seen, when Brij® O10 is present 0.3 wt %, it did not have much of an impact on ameliorating the negative ΔL* value of the ink (comparing initial L* with the L* value after the nozzles and ink began printing evenly in terms of color). However, at 0.5 wt %, the negative ΔL* value is eliminated in favor of positive ΔL* values, which are less visible to the human eye. From this and other studies, it was determined that Surfynol® 104 did not have a significant impact on ameliorating color shift.

Example 4—Statistical Model

Figure 4:
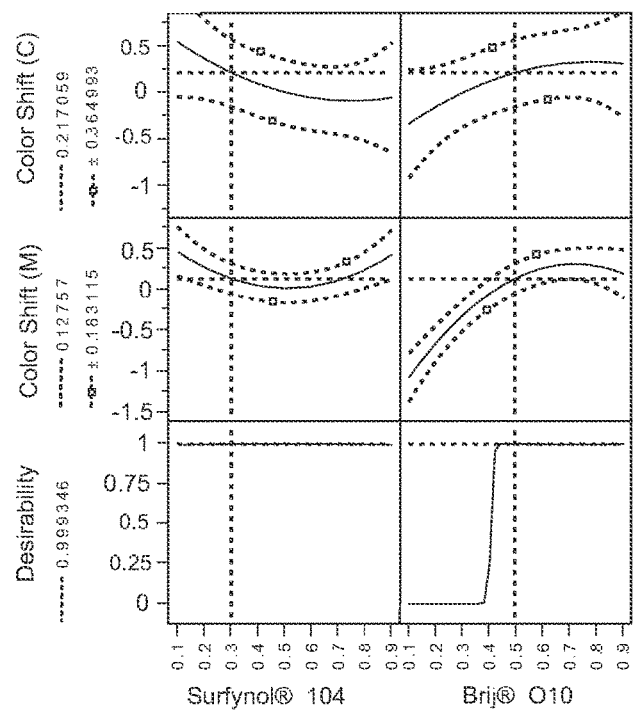
FIG. 4 depicts data collected for cyan and magenta inks related to surfactant concentration in the form of a statistical model in accordance with another example of the present disclosure.

A statistical model was designed to evaluate the impact of Brij® O10 and Surfynol® 104 on color shift (ΔL*). In the model, a polyurethane-containing Cyan (C) and Magenta (M) inks are prepared at various levels, and the data regarding color shift is recorded on a Prediction Profile, as shown in FIG. 4. Essentially, the surfactant concentration was included for each surfactant at 0.1 wt %, 0.5 wt % and 0.9 wt % and the binder was included at 0.5 wt %, 1.0 wt % and 1.5 wt %. (Note that data for the surfactants is shown in FIG. 4). Thus, various inks were generated with these varied levels of components so that all possible combinations were prepared, and the various inks were printed and the color shift measured. Using this color shift data and the various different ink formulations (center point repeated), a statistical model on how each component impacted ΔL* was generated using commercial software (JMP9 Software from SAS Corporation). The model provides data that is continuous over the range investigated, but only 3 levels of each component are used to generate the model. In accordance with this study, it was determined that Surfynol® 104 had little no impact on fixing color shift issues as described herein with respect to the Magenta (M) ink, and had a marginal impact on the Cyan (C) ink. The Brij® O10, on the other hand, had a significant impact in ameliorating the color shift issues introduced by the inclusion of a polyurethane binder into the ink formulation. It was determined that at a concentration starting at about 0.4 wt %, color shift related to ΔL* values was largely reduced to acceptable levels.

While the present technology has been described with reference to certain examples, those skilled in the art will appreciate that various modifications, changes, omissions, and substitutions can be made without departing from the spirit of the disclosure. It is therefore intended that the disclosure be limited only by the scope of the appended claims.

What is claimed is:
1. A pigment-based inkjet ink, comprising:
water;
from 5 wt % to 50 wt % organic solvent system;
from 2 wt % to 9 wt % pigment solids;
from 0.1 wt % to 3 wt % polyurethane binder;
from 0.4 wt % to 1.5 wt % oleyl or stearyl type polyoxyethylene glycol ether surfactant; and non-ionic surfactant present at a lower concentration than the oleyl or stearyl type polyoxyethylene glycol ether surfactant.

2. The pigment-based inkjet ink of claim 1, wherein the non-ionic surfactant is an acetylenic diol non-ionic surfactant.

3. The pigment-based inkjet ink of claim 1, wherein the organic solvent system comprises a triethylene glycol, 2-pyrrolidinone, di-(2-hydroxyethyl)-5,5-dimethylhydantoin, or combination thereof.

4. The pigment-based ink of claim 1, wherein the oleyl or the stearyl type polyoxyethylene glycol ether surfactant is the oleyl type polyoxyethylene glycol ether surfactant.

5. The pigment-based inkjet ink of claim 4, wherein the oleyl type polyoxyethylene glycol ether surfactant is a polyoxyethylene (10) oleyl ether.

6. The pigment-based inkjet ink of claim 1, wherein the oleyl or the stearyl type polyoxyethylene glycol ether surfactant is the stearyl type polyoxyethylene glycol ether surfactant.

7. The pigment-based inkjet ink of claim 1, wherein the concentration of the oleyl or the stearyl type polyoxyethylene glycol ether surfactant is from 0.5 wt % to 1 wt %.

8. The pigment-based inkjet ink of claim 1, wherein the polyurethane binder is a reaction product of polyol containing a vinyl polymer having two hydroxyl groups at one end and at least one polyol.

9. A method of inkjet printing, comprising:
jetting an inkjet ink from a nozzle onto a media substrate, said inkjet ink comprising water, from 5 wt % to 50 wt % of an organic solvent system, from 2 wt % to 9 wt % pigment solids, from 0.1 wt % to 3 wt % polyurethane binder, and from 0.4 wt % to 1.5 wt % of an oleyl or stearyl type polyoxyethylene glycol ether surfactant;
halting jetting from the nozzle for a period of at least 0.5 seconds; and
restarting jetting from the nozzle, wherein an L* value for the inkjet ink initially printed after restarting ranges from an L* difference of −0.2 to 1.5 compared to an L* value of the ink after jetting two inches of inkjet ink on the media substrate.

10. The method of claim 9, wherein the inkjet ink further comprises an acetylenic diol non-ionic surfactant.

11. The method of claim 9, wherein the organic solvent system comprises a triethylene glycol, 2-pyrrolidinone, di-(1-hydroxyethyl)-5,5-dimethylhydantoin, or combination thereof.

12. The method of claim 9, wherein the oleyl or the stearyl type polyoxyethylene glycol ether surfactant is the oleyl type polyoxyethylene glycol ether surfactant.

13. The method of claim 9, wherein the oleyl or the stearyl type polyoxyethylene glycol ether surfactant is the stearyl type polyoxyethylene glycol ether surfactant.

* * * * *

UNITED STATES PATENT AND TRADEMARK OFFICE
CERTIFICATE OF CORRECTION

PATENT NO. : 10,040,959 B2  
APPLICATION NO. : 15/308964  
DATED : August 7, 2018  
INVENTOR(S) : Larrie Deardurff et al.

Page 1 of 1

It is certified that error appears in the above-identified patent and that said Letters Patent is hereby corrected as shown below:

In the Claims

In Column 11, Line 11, Claim 4, after "pigment-based" insert -- inkjet --.

Signed and Sealed this
First Day of January, 2019

Andrei Iancu
*Director of the United States Patent and Trademark Office*